US012785213B2

(12) United States Patent
Hu et al.

(10) Patent No.: US 12,785,213 B2
(45) Date of Patent: Nov. 3, 2026

(54) LOW-INTERNAL-RESISTANCE CERAMIC-COATED SEPARATOR AND PREPARATION METHOD THEREOF, AND LITHIUM BATTERY

(71) Applicant: SINOMA LITHIUM BATTERY SEPARATOR (NINGXIANG) CO., LTD., Hunan (CN)

(72) Inventors: Xuewen Hu, Changsha City (CN); Lianjie Wang, Changsha City (CN); Lihua Wang, Changsha City (CN); Mingjie Hu, Changsha City (CN)

(73) Assignee: SINOMA LITHIUM BATTERY SEPARATOR (NINGXIANG) CO., LTD., Hunan (CN)

( * ) Notice: Subject to any disclaimer, the term of this patent is extended or adjusted under 35 U.S.C. 154(b) by 615 days.

(21) Appl. No.: 18/271,478

(22) PCT Filed: Nov. 30, 2022

(86) PCT No.: PCT/CN2022/135579

§ 371 (c)(1),
(2) Date: Jul. 10, 2023

(87) PCT Pub. No.: WO2024/092934

PCT Pub. Date: May 10, 2024

(65) Prior Publication Data

US 2025/0007095 A1 Jan. 2, 2025

(30) Foreign Application Priority Data

Nov. 4, 2022 (CN) ........................ 202211374693.1

(51) Int. Cl.

| | |
|---|---|
| ***H01M 50/434*** | (2021.01) |
| ***H01M 10/052*** | (2010.01) |
| ***H01M 50/403*** | (2021.01) |
| ***H01M 50/451*** | (2021.01) |
| ***H01M 50/489*** | (2021.01) |

(52) U.S. Cl.

CPC ....... *H01M 50/434* (2021.01); *H01M 10/052* (2013.01); *H01M 50/403* (2021.01); *H01M 50/451* (2021.01); *H01M 50/489* (2021.01)

(58) Field of Classification Search

None

See application file for complete search history.

(56) References Cited

U.S. PATENT DOCUMENTS

| | | | | |
|---|---|---|---|---|
| 2002/0034689 A1* | 3/2002 | Hoshida | H01M 50/417 | 428/317.9 |
| 2016/0164060 A1* | 6/2016 | Zhang | H01M 50/414 | 429/144 |
| 2021/0175483 A1 | 6/2021 | Cheng et al. | | |
| 2022/0149365 A1* | 5/2022 | Inoue | H01M 4/525 | |
| 2023/0187781 A1* | 6/2023 | Cheng | H01M 50/491 | 429/251 |

FOREIGN PATENT DOCUMENTS

| | | | |
|---|---|---|---|
| CN | 107799702 A | 3/2018 | |
| CN | 111341982 A | 6/2020 | |
| CN | 111653712 A | 9/2020 | |
| CN | 111653715 A | 9/2020 | |
| CN | 112018311 A | 12/2020 | |
| CN | 112072047 A | 12/2020 | |
| CN | 114374052 A | 4/2022 | |
| EP | 3691002 A1 * | 8/2020 | H01M 50/426 |

OTHER PUBLICATIONS

Machine translation of CN112072047 A, published on Dec. 11, 2020 (Year: 2020).*

Viscosity, available online at https://en.wikipedia.org/wiki/Viscosity, date unknown.*

International Search Report of PCT/CN2022/135579 mailed on Mar. 7, 2023, ISA/CN.

* cited by examiner

*Primary Examiner* — Anca Eoff

(74) *Attorney, Agent, or Firm* — Yue (Robert) Xu; Apex Attorneys at Law, LLP

(57) ABSTRACT

The present disclosure provides a low-internal-resistance ceramic-coated separator, a preparation method thereof, and a lithium battery. The low-internal-resistance ceramic-coated separator of the present disclosure includes a polymer base film, and a ceramic layer coated on one or two sides of the polymer base film. The ceramic layer adopts low-sodium boehmite and does not contain sodium carboxymethyl cellulose (CMC). A sodium content of the ceramic layer is less than 1000 ppm, so that a Gurley increase value of the separator is significantly lowered. When applied to the lithium battery, the ceramic layer can greatly reduce an internal resistance of a cell, thereby improving the power performance and discharge efficiency of the battery.

10 Claims, 1 Drawing Sheet

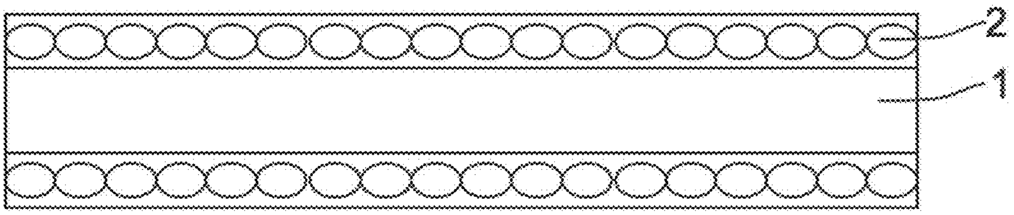
2
1

LOW-INTERNAL-RESISTANCE CERAMIC-COATED SEPARATOR AND PREPARATION METHOD THEREOF, AND LITHIUM BATTERY

CROSS REFERENCE TO RELATED APPLICATIONS

The present disclosure claims priority to Chinese Patent Application No. CN CN202211374693.1 filed on Nov. 4, 2022, entitled "LOW-INTERNAL-RESISTANCE CERAMIC-COATED SEPARATOR AND PREPARATION METHOD THEREOF, AND LITHIUM BATTERY", the entire contents of which are incorporated herein by reference.

FIELD

The present disclosure relates to the technical field of lithium battery separators, in particular to a low-internal-resistance ceramic-coated separator and a preparation method thereof, and a lithium battery.

BACKGROUND

In recent years, new energy vehicles have higher and higher requirements for high rate charge and discharge performance of power batteries. Internal resistance is an important factor affecting battery power performance and discharge efficiency, and the initial scale of internal resistance is mainly determined by the structural design, raw material performance and process technology of the batteries. With the use of lithium batteries, battery performance continues to decay, mainly manifested as capacity attenuation, internal resistance increase, power decrease, etc. The change of battery internal resistance is affected by temperature, depth of discharge and various other use conditions.

The main factors influencing ion impedance of a separator are: electrolyte distribution in the separator, and area, thickness, pore size, porosity and tortuous coefficient of the separator. Ion conduction inside the battery depends on the diffusion of Li ions in the electrolyte through the porous separator, and the liquid absorption and wetting ability of the separator is the key to forming a good ion flow channel. When the separator has a higher liquid absorption rate and porous structure, it can improve the conductivity, reduce the battery impedance, and improve the rate performance of the battery.

Compared with ordinary base films, ceramic separators and glued separators are not only higher in high temperature shrinkage resistance, but also greater in liquid absorption and wetting ability. However, the internal resistance of an existing ceramic-coated separator still needs to be further reduced.

In the prior art, the internal resistance of the ceramic-coated separator is mainly controlled through the adjustment of the thickness of the separator and the air permeability value. Usually, the thinner the separator, the smaller the resistance encountered when solvated lithium ions cross through, the better the ion conductivity, the lower the internal resistance, the greater the Gurley value, and the greater the internal resistance. However, less attention is paid to the influence of the composition ratio of coating slurry on the internal resistance of the coated separator.

In the prior art, a conventional method of preparing boehmite is the Bayer method. That is, bauxite is treated with sodium hydroxide to obtain a sodium aluminate solution, finally the aluminum hydroxide is re-precipitated to obtain the boehmite, and a certain amount of sodium is introduced in the process. In the preparation of boehmite ceramic slurry, in order to enhance the adhesion between boehmite and the base film, improve the peeling strength of the separator, a CMC solution is usually added. At the same time, CMC, as a suspension agent, can improve the particle settlement after the slurry is prepared.

SUMMARY

The present disclosure aims to provide a low-internal-resistance ceramic-coated separator, a preparation method thereof, and a lithium battery with the aforesaid separator, which can lower the internal resistance of a cell and thus improve the power performance and discharge efficiency of the battery.

The present disclosure is implemented as follows:

the present disclosure first provides a low-internal-resistance ceramic-coated separator, including: a polymer base film, and a ceramic layer coated on one or two sides of the polymer base film.

The ceramic layer has a sodium content of less than 1000 ppm, and does not contain sodium carboxymethyl cellulose (CMC).

A peel strength between the ceramic layer and the polymer base film is 20 N/m or above. Optionally, the peel strength is 20-70 N/m, or 30 N/m-70 N/m, or 40 N/m-70 N/m, for example, 45 N/m, 50 N/m, 55 N/m, 60 N/m, or 65 N/m.

Through formula adjustment, the low-internal-resistance ceramic-coated separator of the present disclosure has an ionic conductivity of 1.4 mS/cm or above, or 1.5 mS/cm or above.

Optionally, the ceramic layer is formed by coating of ceramic slurry. Because the CMC is omitted, the ceramic slurry has a lower viscosity than conventional ceramic slurry, and has a viscosity of 10-40 mPa's, for example, 35 mPa's or below, 30 mPa's or below, or 25 mPa's or below. A solid content of the ceramic slurry is 25%-35%.

Optionally, the ceramic slurry includes the following components:

dispersant: 2-6 parts by weight;

low-sodium boehmite powder: 292 parts by weight;

binder: 20-60 parts by weight; and wetting agent: 1-4 parts by weight.

The low-sodium boehmite powder has a sodium content of less than or equal to 100 ppm.

Optionally, the ceramic slurry further contains a leveling agent: 30-50 parts by weight; in an optional embodiment, a model of the leveling agent is UNISAFE WHS-10.

Optionally, the ceramic layer has a thickness of 1-5 μm, and an areal density of 8-10 $g/m^2$.

Optionally, the low-internal-resistance ceramic-coated separator has a Gurley value of 75-175 s/100cc.

Optionally, the low-internal-resistance ceramic-coated separator has a water content of less than 1000 ppm, optionally less than 700 ppm or less than 500 ppm.

Optionally, the polymer base film is a polyolefin microporous film. Optionally, the polyolefin microporous film is a polyethylene microporous film, a polypropylene microporous film or a two-layer or multi-layer composite film composed of a polyethylene microporous film and a polypropylene microporous film.

The present disclosure further provides a preparation method of the above low-internal-resistance ceramic-coated separator, including the following steps.

Step 1, preparing ceramic slurry: adding 292 parts by weight of low-sodium boehmite powder, 2-6 parts by weight of a D-3019 dispersant, 20-60 parts by weight of a BM-900B binder, and 1-4 parts by weight of a 202E type wetting agent, and stirring and dispersing all the components in water uniformly to obtain the stable ceramic slurry.

Step 2, coating the slurry: providing a polymer base film, coating the surface of the base film by adopting a gravure roller to form a ceramic layer, and adjusting operating parameters of the gravure roller according to a viscosity and a solid content of the ceramic slurry, so as to meet the requirements of a ceramic layer coating thickness and an areal density.

Optionally, the gravure roller has a number of lines per inch of 140-189 and a line depth of 30-50 μm, a coating speed is 80-140 s/m, and a speed ratio is 90%-100%. The speed ratio is a ratio of an operating speed of the gravure roller and an operating speed of a coating machine.

Step 3, drying the ceramic layer to obtain the low-internal-resistance ceramic-coated separator.

Optionally, in step 2, before coating the base film, the ceramic slurry is continuously stirred at a low rotating speed of 10-30 r/min to prevent the low viscosity ceramic slurry from settling before coating.

Optionally, the environmental humidity is controlled to be 1% or below during the preparation process, so that the water content of the low-internal-resistance ceramic-coated separator is lowered.

The present disclosure further provides a lithium battery, including a positive electrode, a negative electrode, a non-aqueous electrolytic solution, and the above low-internal-resistance ceramic-coated separator or the low-internal-resistance ceramic-coated separator obtained according to the above preparation method.

The present disclosure has the following beneficial effects:

according to the low-internal-resistance ceramic-coated separator provided by the present disclosure, the ceramic layer coated on the one or two sides of the polymer base film adopts low sodium boehmite, and does not contain sodium carboxymethyl cellulose. The ceramic layer has a sodium content of less than 1000 ppm, so the Gurley increase value of the separator can be significantly lowered. When applied to the lithium battery, the ceramic layer can greatly reduce the internal resistance of the cell, thereby improving the power performance and discharge efficiency of the battery, and significantly reduce the internal resistance of the separator, so that the separator obtains good use performance.

BRIEF DESCRIPTION OF THE DRAWINGS

In order to more clearly illustrate the technical solution of the embodiment of the present disclosure, the accompanying drawings that need to be used in the embodiment will be briefly introduced below. It should be understood that the accompanying drawings below only show certain embodiments of the present disclosure, and therefore should not be regarded as a limitation of a scope. For those of ordinary skill in the art, on the premise without creative labor, other relevant accompanying drawings may further be obtained according to these accompanying drawings.

The FIGURE is a schematic structural diagram of a low-internal-resistance ceramic-coated separator of the present disclosure.

DETAILED DESCRIPTION OF THE EMBODIMENTS

In order to make the purpose, technical solution and advantages of the embodiments of the present disclosure clearer, the technical solution in the embodiments of the present disclosure will be clearly and completely described below. If the conditions are not indicated in the embodiment, general conditions or the conditions recommended by a manufacturer shall be adopted. Any reagents or instruments used without indicating manufacturers are all conventional products that can be purchased commercially.

As shown in the FIGURE, a low-internal-resistance ceramic-coated separator of the present disclosure includes: a polymer base film 1, and a ceramic layer 2 coated on one or two sides of the polymer base film 1. The present disclosure starts from a formula of the ceramic layer, uses powder with a low sodium (Na) content to eliminate the influence of sodium on lithium batteries, and uses low-sodium boehmite powder with a Na content of less than 100 ppm. At the same time, the current mainstream addition of a sodium carboxymethyl cellulose (CMC) solution is removed from ceramic slurry. On the one hand, because CMC contains Na, it will also affect the lithium batteries due to the introduction of Na, so CMC needs to be removed. On the other hand, because the CMC has a large number of carboxymethyl groups and hydroxyl groups belonging to hydrophilic groups on its main chain, the CMC belongs to superabsorbent substances, and its equilibrium water increases with the increase of ambient humidity and decreases with the rise of temperature. The absence of CMC in the separator will also greatly reduce the proportion of absorbent substances, thereby reducing the water content of the separator and reducing the influence of moisture on the internal resistance of the separator.

While meeting other physical property requirements of the ceramic-coated separator, the present disclosure reduces the sodium content in the slurry as much as possible to achieve the effect of reducing the internal resistance of the separator, so that the separator obtains good use performance. The reason is that sodium and lithium are unified main group elements and the high sodium content in the slurry will affect the diffusion of lithium ions in the battery, so the present disclosure inhibits the influence of sodium ions on the diffusion of the lithium ions by controlling the content of sodium in the separator to be below 1000 ppm. In the application of lithium batteries, the ion conductivity of the ceramic-coated separator of the present disclosure can be more than 1.4 mS/cm, or can be more than 1.5 mS/cm.

Optionally, through adjustment to the formula of the ceramic slurry and a process, other physical properties of the ceramic-coated separator of the present disclosure also meet the use requirements while the internal resistance of the ceramic-coated separator is reduced. Mainly, first, under the premise of removing the CMC, the requirements for a thickness of the ceramic layer coating are met by setting a ceramic slurry solid content gradient; second, the present disclosure reduces the air permeability increase value and increases the Gurley value to a suitable range by adjusting the content of adhesives and additives; third, in the process of making the ceramic layer, the present disclosure adjusts the process parameters of coating, increases the continuous stirring process of the slurry, and prevents the precipitation of the slurry; and four, the present disclosure solves the problem of reducing the peel strength caused by absence of CMC through additive adjustment, so that the peel strength meets the needs of use.

The following is a further detailed description of the features and performance of the present disclosure in conjunction with embodiments and reference embodiments.

Embodiment 1

(1) Preparing ceramic slurry: Low-sodium boehmite powder (BG-611D), pure water and a dispersant (D-3019) are added into a double-planet stirring tank for stirring and dispersion, and then a binder (BM-900B), a leveling agent (UNISAFE WHS-10) and a wetting agent (202E) are added in sequence.

(2) Preparing a low-internal-resistance ceramic-coated separator: The ceramic slurry is coated on two surfaces of a PE microporous base film with a thickness of 12 μm to form ceramic layers. The coating thickness on each surface is 1.5 μm. A gravure roller has a number of lines per inch of 150 and a line depth of 40 μm, a speed ratio is 90%, and the ultra-low-internal-resistance ceramic-coated separator is obtained after drying.

Embodiment 2

(1) Preparing ceramic slurry: Low-sodium boehmite powder (BG-611D), pure water and a dispersant (D-3019) are added into a double-planet stirring tank for stirring and dispersion, and then a binder (BM-900B), a leveling agent (UNISAFE WHS-10) and a wetting agent (202E) are added in sequence.

(2) Preparing a low-internal-resistance ceramic-coated separator: The ceramic slurry is coated by a gravure roller on two surfaces of a PE porous separation film with a thickness of 12 μm to form ceramic layers. The coating thickness on each surface is 1.5 μm. The gravure roller has a number of lines per inch of 150 and a line depth of 40 μm, a speed ratio is 90%, and the ultra-low-internal-resistance ceramic-coated separator is obtained after drying.

Embodiment 3

(1) Preparing ceramic slurry: Low-sodium boehmite powder (BG-611D), pure water and a dispersant (D-3019) are added into a double-planet stirring tank for stirring and dispersion, and then a binder (BM-900B), a leveling agent (UNISAFE WHS-10) and a wetting agent (202E) are added in sequence.

(2) Preparing a low-internal-resistance ceramic-coated separator: The ceramic slurry is coated by a gravure roller on two surfaces of a PE porous separation film with a thickness of 12 μm to form ceramic layers. The coating thickness on each surface is 1.5 μm. The gravure roller has a number of lines per inch of 150 and a line depth of 40 μm, a speed ratio is 90%, and the ultra-low-internal-resistance ceramic-coated separator is obtained after drying.

Embodiment 4

(1) Preparing ceramic slurry: Low-sodium boehmite powder (BG-611D), pure water and a dispersant (D-3019) are added into a double-planet stirring tank for stirring and dispersion, and then a binder (BM-900B), a leveling agent (UNISAFE WHS-10) and a wetting agent (202E) are added in sequence.

(2) Preparing a low-internal-resistance ceramic-coated separator: The ceramic slurry is coated by a gravure roller on two surfaces of a PE porous separation film with a thickness of 12 μm to form ceramic layers. The coating thickness on each surface is 1.5 μm. The gravure roller has a number of lines per inch of 150 and a line depth of 40 μm, a speed ratio is 90%, and the ultra-low-internal-resistance ceramic-coated separator is obtained after drying.

Reference Embodiment 1

(1) Preparing ceramic slurry: Low-sodium boehmite powder (BG-611D), pure water and a dispersant (D-3019) are added into a double-planet stirring tank for stirring and dispersion, and then a binder (BM-900B), a B1-CMC1220 solution and a wetting agent (202E) are added in sequence.

(2) Preparing a low-internal-resistance ceramic-coated separator: The ceramic slurry is coated on two surfaces of a PE porous separation film with a thickness of 12 μm to form ceramic layers. The coating thickness on each surface is 1.5 μm. A gravure roller has a number of lines per inch of 180 and a line depth of 30 μm, a speed ratio is 90%, and the ceramic-coated separator is obtained after drying.

Reference Embodiment 2

(1) Preparing ceramic slurry: Low-sodium boehmite powder (BG-611), pure water and a dispersant (D-3019) are added into a double-planet stirring tank for stirring and dispersion, and then a binder (BM-900B) and a wetting agent (202E) are added in sequence.

(2) Preparing a low-internal-resistance ceramic-coated separator: The ceramic slurry is coated on two surfaces of a PE porous separation film with a thickness of 12 μm to form ceramic layers. The coating thickness on each surface is 1.5 μm. A gravure roller has a number of lines per inch of 180 and a line depth of 30 μm, a speed ratio is 90%, and the ceramic-coated separator is obtained after drying.

Reference Embodiment 3

(1) Preparing ceramic slurry: Low-sodium boehmite powder (BG-611), pure water and a dispersant (D-3019) are added into a double-planet stirring tank for stirring and dispersion, and then a binder (BM-900B), a B1-CMC1220 solution and a wetting agent (202E) are added in sequence.

(2) Preparing a low-internal-resistance ceramic-coated separator: The ceramic slurry is coated on two surfaces of a PE porous separation film with a thickness of 12 μm to form ceramic layers. The coating thickness on each surface is 1.5 μm. A gravure roller has a number of lines per inch of 180 and a line depth of 30 μm, a speed ratio is 90%, and the ceramic-coated separator is obtained after drying.

The formulas and process parameters of the ceramic slurry in the above embodiments and reference embodiments are shown in Table 1 below:

TABLE 1

Summary Table of Formulas and Process Parameters of Ceramic Slurry in Embodiments and Reference Embodiments

| | Embodiment 1 | Embodiment 2 | Embodiment 3 | Embodiment 4 | Reference Embodiment 1 | Reference Embodiment 2 | Reference Embodiment 3 |
|---|---|---|---|---|---|---|---|
| Dispersant (kg) | 0.523 | 0.523 | 0.723 | 0.523 | 0.523 | 0.523 | 0.523 |
| Binder (kg) | 13.197 | 10.197 | 10.197 | 7.197 | 10.197 | 10.197 | 10.197 |
| Wetting agent (kg) | 0.222 | 0.222 | 0.422 | 0.19 | 0.222 | 0.222 | 0.222 |
| Leveling agent (kg) | 4.815 | 7.815 | 7.415 | 10.825 | — | — | — |
| Low-sodium boehmite (kg) | 60 | 60 | 60 | 60 | 60 | — | — |
| Boehmite (kg) | — | — | — | — | — | 60 | 60 |
| B1-CMC1220(kg) | — | — | — | — | 25.35 | — | 25.35 |
| Solid content of slurry (%) | 30.57 | 30.45 | 30.63 | 30.41 | 38.14 | 30.21 | 38.65 |
| Viscosity (mPa · s) | 32 | 22 | 25 | 19 | 45 | 24 | 49 |

<Evaluation Method>

(1) a Peel Strength Between the Ceramic Layer and the Base Film 12-mm-wide and 15-cm-long adhesive tape (made by Scotch, model 550R-12) is attached to a surface of the ceramic layer on one side of the separator, and the separator is cut so that its width and length are consistent with the width and length of the adhesive tape to make a test sample. When attaching the adhesive tape to the separator, the length direction is consistent with an MD direction of the separator. It should be noted that the adhesive tape is used as a support for peeling off the ceramic layer of one side.

The test sample is placed in an atmosphere with a temperature of 23±1° C. and a relative humidity of 50±5% for more than 24 hours, and the following tests are performed in the same atmosphere.

The adhesive tape and the ceramic layer immediately below it are peeled off together by about 10 cm, so that a laminator (1) of the adhesive tape and the ceramic layer and a laminator (2) of a porous substrate and the ceramic layer of the other side are separated by about 10 cm. An end of the laminator (1) is fixed to an upper chuck of TENSILON (RTC-1210A made by Orientec), and an end of the laminator (2) is fixed to a lower chuck of the TENSILON. The test sample is suspended in a gravitational direction so that a tensile angle (an angle of the laminator (1) relative to the test sample) becomes 180°. The laminator (1) is stretched at a tensile speed of 20 mm/min to test a load of peeling the laminator (1) off the porous substrate. Loads from 10 mm to 40 mm after the start of the test are acquired at 0.4 mm intervals, and an average value of these loads is used as the peel strength.

(2) Internal Resistance and Ion Conductivity of the Separator

The internal resistance and ion conductivity are tested through electrochemical impedance spectroscopy (EIS). The separator sample is assembled into a button battery in the order of positive electrode shell-separator-stainless steel sheet gasket-spring gasket-negative electrode shell. Alternating current impedance scanning is performed by using an electrochemical workstation at a frequency of 0.01 HZ-106 HZ, and a voltage amplitude of 5 mV, so as to obtain the internal resistance Rb of the separator. A calculation formula for calculating the ion conductivity of the separator is: K=d/(S*Rb), where K is the ionic conductivity (mS/cm) of the separator, d is the thickness (cm) of the separator, S is the effective working area ($cm^2$) of the separator.

(3) Gurley Value

A composite separator sample of 100 mm×100 mm is cut, an American Gurley4110N air permeability tester is used to perform a test in a 100 cc test gas mode. The time when all the test gas passes through the composite separator sample is recorded as the Gurley value.

Referring to Table 2, the performance test results of separators prepared in the above embodiments and reference embodiments are compared as follows:

TABLE 2

Relevant Performance Parameter Table of Ceramic-Coated Separators Prepared in Embodiments and Reference Embodiments

| | Gurley increase value (s/100 cc) | Internal resistance of separator (Ω) | Ion conductivity (mS/cm) | Peel strength (N/m) |
|---|---|---|---|---|
| Embodiment 1 | 33 | 0.158 | 1.54 | 27 |
| Embodiment 2 | 31 | 0.144 | 1.63 | 45 |
| Embodiment 3 | 42 | 0.153 | 1.49 | 39 |
| Embodiment 4 | 29 | 0.147 | 1.60 | 25 |
| Reference Embodiment 1 | 36 | 0.173 | 1.38 | 110 |
| Reference Embodiment 2 | 42 | 0.179 | 1.34 | 19 |
| Reference Embodiment 3 | 45 | 0.184 | 1.3 | 125 |

It can be seen from the results of Tables 1-2 above that the present disclosure uses the low-sodium boehmite and cancels the addition of the CMC solution, so that the Gurley increase value and the sodium content of the separator are reduced, which can significantly reduce the internal resistance of the separator and make the separator obtain good use performance. At the same time, the slurry settlement problem caused by the cancellation of the addition of the CMC solution can be solved by adjusting the preparation process parameters of the ceramic layer, and stirring can be performed at a low speed after the preparation is completed, so as to prevent settling. The operating parameters of the gravure roller are adjusted to obtain the ideal thickness and areal density of the ceramic layer. In addition, due to the cancellation of the addition of the CMC solution, the bonding performance of the ceramic slurry has decreased, and the peel strength of the ceramic coating layer has also been reduced, but through adjustment to the formula of the ceramic layer slurry, the present disclosure can make the peel strength of the ceramic layer still meet the use requirements of greater than 20 N/m. By comparing Embodiment 2 with Embodiment 1, it can be seen that the ceramic peel strength can be further improved by adding a leveling agent solution, so that the peel strength of the ceramic layer is increased to 40 N/m or above.

The foregoing is only optional embodiments of the present disclosure and is not intended to limit the present disclosure. For those of skill in the art, the present disclosure may have various changes and variations. Any modification, equivalent substitution, improvement, etc. made within the spirit and principles of the present disclosure shall be included within the scope of protection of the present disclosure.

What is claimed is:

1. A low-internal-resistance ceramic-coated separator, comprising: a polymer base film, and a ceramic layer coated on one or two sides of the polymer base film; wherein the ceramic layer has a sodium content of less than 1000 ppm, and does not contain sodium carboxymethyl cellulose; wherein the ceramic layer is formed by coating of ceramic slurry, wherein the ceramic slurry has a viscosity of 10-40 mPa's, and a solid content of 25%-35%; wherein the ceramic slurry comprises the following components:

dispersant: 2-6 parts by weight;

low-sodium boehmite powder: 292 parts by weight; wherein the low-sodium boehmite powder has a sodium content of less than or equal to 100 ppm;

binder: 20-60 parts by weight; and wetting agent: 1-4 parts by weight;

a peel strength between the ceramic layer and the polymer base film is 20 N/m or above;

the low-internal-resistance ceramic-coated separator has an ionic conductivity of 1.4 mS/cm or above.

2. The low-internal-resistance ceramic-coated separator according to claim 1, wherein the peel strength between the ceramic layer and the polymer base film is 20-70 N/m.

3. The low-internal-resistance ceramic-coated separator according to claim 1, wherein the ceramic slurry further comprises a leveling agent: 30-50 parts by weight.

4. The low-internal-resistance ceramic-coated separator according to claim 1, wherein the ceramic layer has a thickness of 1-5 μm, and an areal density of 8-10 $g/m^2$.

5. The low-internal-resistance ceramic-coated separator according to claim 1, wherein the low-internal-resistance ceramic-coated separator has a Gurley value of 75-175 s/100cc.

6. The low-internal-resistance ceramic-coated separator according to claim 1, wherein the low-internal-resistance ceramic-coated separator has a water content of less than 1000 ppm.

7. A preparation method of the low-internal-resistance ceramic-coated separator according to claim 1, comprising the following steps:

Step 1, preparing ceramic slurry, including stirring and dispersing all components in water uniformly to obtain stable ceramic slurry;

Step 2, coating the slurry: providing a polymer base film, and coating the surface of the base film by adopting a gravure roller to form a ceramic layer; and Step 3, drying the ceramic layer to obtain the low-internal-resistance ceramic-coated separator.

8. The preparation method of the low-internal-resistance ceramic-coated separator according to claim 7, wherein in the step 2, before coating the base film, the ceramic slurry is continuously stirred at a rotating speed of 10-30 r/min; the gravure roller has a number of lines per inch of 140-189, and a line depth of 30-50 μm, a coating speed is 80-140 s/m, and a speed ratio is 90%-100%.

9. The preparation method of the low-internal-resistance ceramic-coated separator according to claim 7, wherein the environmental humidity is controlled to be 1% or below during the preparation process.

10. A lithium battery, comprising a positive electrode, a negative electrode, a non-aqueous electrolytic solution, and the low-internal-resistance ceramic-coated separator according to claim 1.

* * * * *